Dec. 18, 1962 W. K. ROBBINS 3,068,637
DETACHABLE LINK CONNECTOR HAVING
LATERALLY REMOVABLE CROSS BAR
Filed Aug. 11, 1959 2 Sheets-Sheet 2

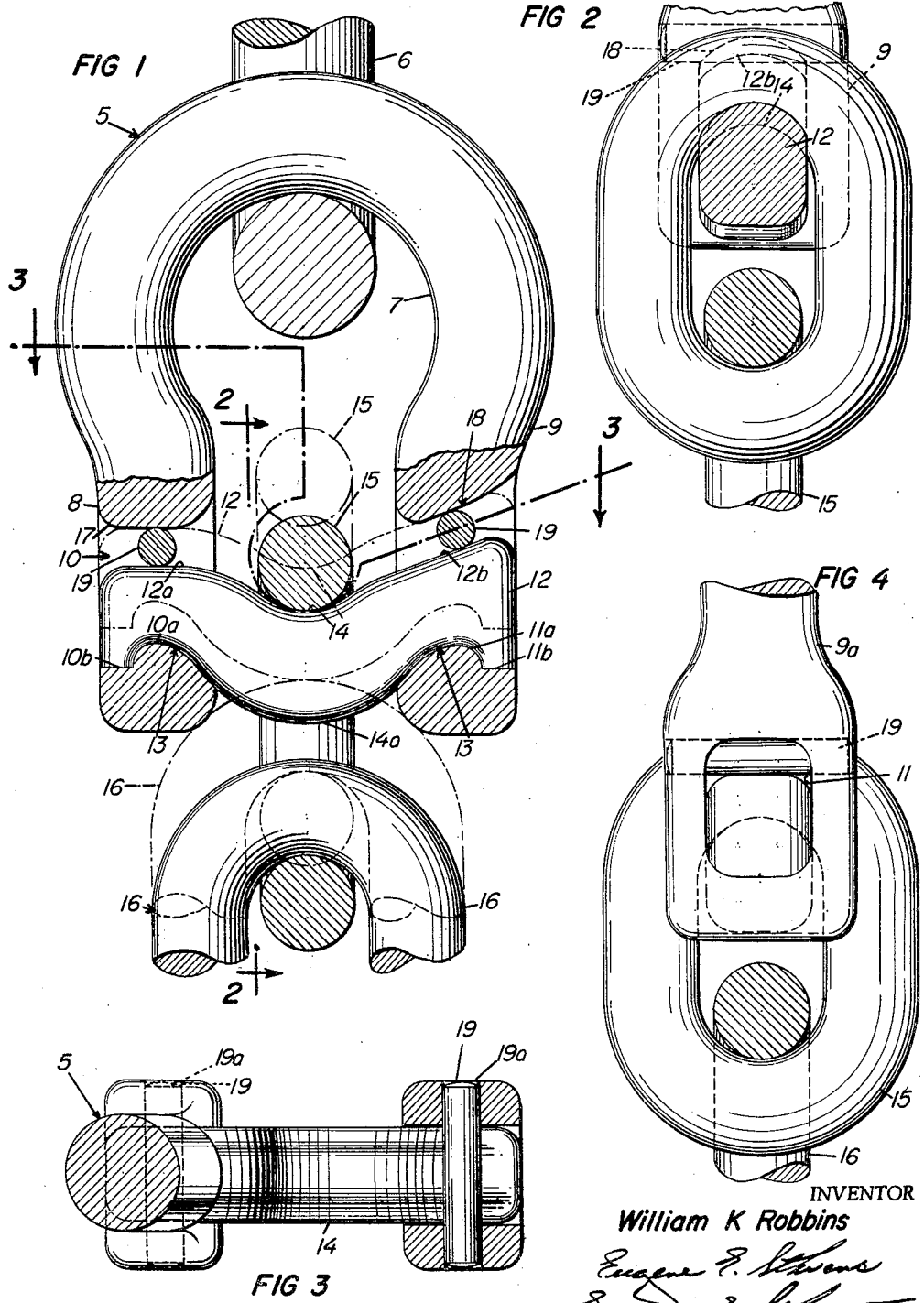

INVENTOR
William K. Robbins
BY
ATTORNEY 3,068,637
DETACHABLE LINK CONNECTOR HAVING LATERALLY REMOVABLE CROSS BAR
William K. Robbins, 13453 Moorpark St., Sherman Oaks, Calif.
Filed Aug. 11, 1959, Ser. No. 832,945
4 Claims. (Cl. 59—85)

My invention relates to separable section links or connectors for chains, wire rope assemblies and the like; and is an improvement over the three section connector disclosed in my Patent No. 2,877,621, dated March 17, 1959.

As in the case of my above mentioned patent, my present connector is especially suitable for use in the excavating field in lieu of the solid drag-bucket-carried wear ring connector for the conventional lift and pull chains. The present device also serves as a highly satisfactory connector for kiln chains, buoy chains, anchor chains and the components of slings generally.

In recognition of the growing practice of sling users to make up their own slings, the present invention has for its primary object to provide a separable section sling element connector which, while being inexpensive, strong and durable, can be assembled and disassembled faster and easier than prior connectors. The ease with which the connector can be assembled is also, of course, an important consideration in anchor chain use, when a diver is working under water.

Also, the invention contemplates a device, as characterized, which cannot loosen or come apart in service, and which incorporates a load-free locking member.

An additional aim of the invention is to furnish a shackle-form connector for the purposes indicated that is safer to use than prior art shackle type devices because the removable load-supporting pin or bar incorporates seating means for a load-carrying connection which prevents the latter from shifting sidewardly in service, the said seating means further functioning with adjacent side portions of the shackle to resist bending of said pin (or bar) under excessive loads.

The foregoing and other objects and advantages of the invention will be readily understood and appreciated by those versed in the art upon reference to the accompanying drawing which illustrates two forms of the invention. It is to be taken as illustrative rather than limitative, since the inventive concept is susceptible of other mechanical expressions within the spirit and scope of the subject matter claimed hereinafter.

In the drawing, wherein the same reference characters have been used to designate the same parts wherever they appear in the several views:

FIG. 1 is a front elevational view, partly broken and partly in section of a shackle type connector embodying my invention and showing adjacent chain links;

FIG. 2 is a sectional view taken on line 2—2 of FIG. 1;

FIG. 3 is a section on line 3—3 of FIG. 1;

FIG. 4 is a fragmentary side elevational view of the right hand side of the assembly as seen in FIG. 1.

Figure 6:
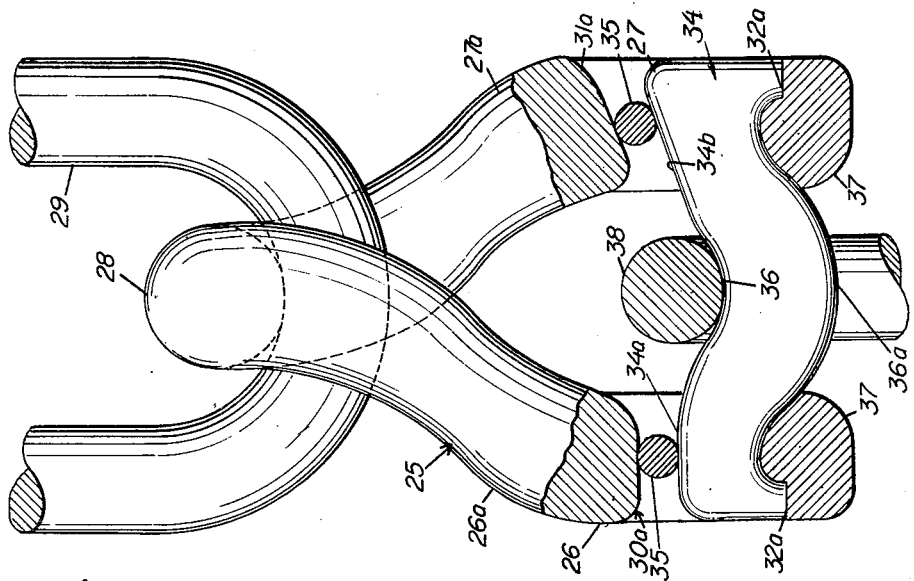
FIG. 6 is a view, partly in section, of the modified device taken at right angles to FIG. 5.

Referring to the drawing by reference characters, the shackle type connector 5 is shown as providing the laterally spaced arms 8, 9 which are curved to provide the recess enlargement 7 adjacent the closed load-sustaining inner end of the device that is supported by link or connection 6.

The respective arms 8, 9 have adjacent their free ends the aligned sockets which are defined by openings 10, 11, respectively, that provide the transverse seats 10a, 11a.

The respective seats 10a, 11a rise above the plane of related outer shoulders 10b, 11b which are provided by the transverse socket wall which is closest to the free ends of arms 8, 9.

As shown, the respective sockets 10, 11 receive and seat the headed ends of the saddle-like load-sustaining bar 12 which closes the open end of shackle 5.

FIG. 4 shows the headed ends of bar 12 as making flat contact with the opposite side walls of the related sockets 10, 11; and FIG. 1 indicates that the depth of each seated head end of bar 12 is less than the socket depth in a direction lengthwise of arms 8, 9. Thus the back edge or upper edge portions 12a, 12b of the respective bar end heads, as seen in FIG. 1, will be in spaced opposition to the related socket walls 17, 18 which are opposed to seats 10a, 11a.

Each headed end of bar 12 has the transverse lower edge-provided recess 13 engaging the opposed socket-provided seat 10a, or 11a; and also the depending terminal nose portion 13a which is disposed in spaced opposition to the adjacent socket-provided outer shoulder 10b or 11b.

Inwardly of each terminal head portion, the bar 12 is offset in the direction of the outer ends of arms 8, 9 so that the back or top edge of said bar provides a depressed transverse seat 14 for a load-supporting link 15. The bar offset referred to provides the lower bar edge with a convex hump 14a, which as illustrated, is a continuation of the transverse curve of the adjacent socket-provided seats 10a, 11a.

It is to be noted that the bar (12) supported link 15 supports a link or connection 16.

Bar 12 is locked in seated position by pins 19 which extend through aligned holes 19a in the opposed walls of the respective sockets 10, 11. Pins 19 may be bolts or rivets, but are preferably self locking so-called groove pins which are characterized by one or more longitudinally extending surface grooves of progressively increasing width in the direction of one end. Pins 19 engage the back edges 12a, 12b of bar 12.

It is to be noted that the back edges 12a, 12b of the respective bar end heads and the related opposed socket walls 17, 18 are parallel in each instance. However, the said surfaces 12a, 17 are substantially normal to the axis of arm 8 while surfaces 12b, 18, as it is important to note, slant away from the free end of the arm 9 at a substantial angle as indicated in FIG. 1.

Thus when pins 19 have been driven out and bar 12 has been shifted to bring surfaces 12b, 18 into engagement, the bar can be slid rightwardly (FIG. 1) out of operative position, it being understood that link 15 is free to shift vertically. In other words, the surface slant 12b, 18 in such movement, results in the bottom edge bar hump 14a clearing the raised seat 11a of socket 11.

As will be appreciated, the arrangement above described enables me to accomplish bar 12 removal in a two section connector. This eliminates the expensive necessity for the outwardly swinging side-providing arms of my patented connector to which reference has been made herein.

FIG. 1 shows the lower inner corners of sockets 10, 11 as beveled (20) so that engagement of the lower link 16 with sockets 10, 11 will not prevent such relative upward shifting of upper link 15 with respect to bar 12 as is necessary to admit of sideward withdrawal of the latter.

In addition to providing for ready assembly and disassembly of the bar 12 and shackle 5, the slant of the bar back portion 12b and opposed socket wall surface 18 enables me to space same the same distance apart as 12a, 17. Thus, the same sized retaining pin 19 can be used in each location.

Furthermore, if the spacement between the horizontal bar and socket walls 12a, 17 at the left in FIG. 1 remains as shown and the spacement between the bar and socket walls 12b, 18 at the right (FIG. 1) is simply increased to enable 14a to clear 13 of socket 11 when the bar is inserted or removed and without resorting to the slant indicated, then the size of the socket end of arm 9 will have to be increased to accommodate a larger pin 19 if the socket 11 is to have load-supporting capacity equal to socket 10.

Additionally, the similarly slanted bar back and socket wall surfaces 12b, 18 constitutes an elongated sustaining guide for bar 12 when it is being inserted or removed. This facilitates each operation. Pins 19, being in compression, rather than in shear are, of course, load free.

When the illustrated assembly is under longitudinal load, the depressed bar seat 14a prevents link 15 from shifting sidewardly. This is an important safety factor as it assures against a workman's fingers getting crushed between link 15 and an adjacent socket 10 (or 11).

The central vertical concavo-convexity 14, 14a of bar 12 prevents it from bending under excessive longitudinal loads. The engagement of bar end recesses 13 with socket seats 10a, 11a, of course, prevents the depending nose portions 13a of bar 12 from shifting inwardly under longitudinal link loads. Thus it is explained that for bar 12 to bend under load the shackle arms 8, 9 must approach one another. But this is prevented by engagement of opposed lower portions of the shackle arm sockets 10, 11 with the adjacent lower bar hump 14a defining curves of bar 12. Also upward camming of the bar 12 by seat and recess engagement (10a, 13 and 11a, 13) is prevented by the in-compression-pins 19. Therefore, the bar 12 can only fail due to elongation of its body to the breaking point.

The shackle and bar assembly 5, 12 will have a load-sustaining capacity equal to that of the links 6, 15, 16 or other connections with which it is used.

Figure 5:
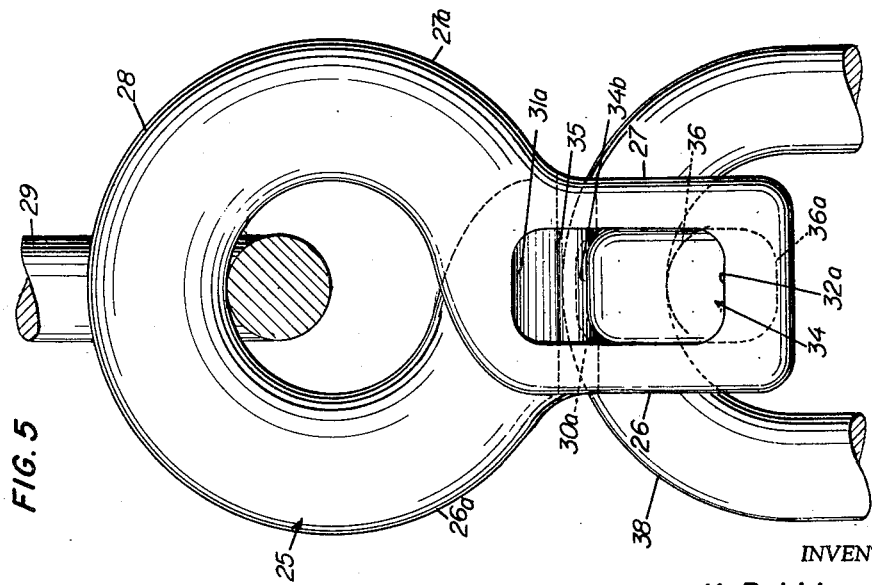
FIG. 5 is a front elevational view of a modified form of the invention incorporated in a portion of a chain length.

FIGS. 5 and 6 disclose a modified form of connector 25 for use, when required, to prevent chain-twisting and particularly as to such as the several predeterminedly short chain lengths which suspend a heavy duty industrial electro-magnet from the hoisting tackle-carried bull ring of a dirigible crane or the like.

The respective bull-ring-carried supporting chains of the electro-magnets mentioned are connected to different ones of circumferentially spaced magnet back-carried lugs. Unless the end links of said magnet-supporting chain lengths (meaning those connected to bull ring and to a lug) lie in planes which prevent chain twisting in service, undue wear results and the chain length will be short lived.

Thus, in carrying out the invention as disclosed in FIGS. 5 and 6, the respective laterally spaced arms 26, 27 are twisted (26a, 27a) to dispose the closed load-supporting connector end 28 in a plane which is in approximately 90° cross-wise alignment with the concaved central seat 36 of the socket (30, 31) supported cross bar 34.

Except as noted hereinabove, the FIGS. 5, 6 structure and that shown in FIGS. 1–4 are identical. The respective socket and bar surfaces 30a, 34a and 31a, 34b correspond to 17, 12a and 18, 12b in FIGS. 1–4, and pins 35 are mounted and function as do pins 19 in the first described form of the invention. The FIGS. 5 and 6 socket formations 32, 32a and 37 are like 10a, 10b, 20 in FIG. 1; and bar (34) formations 33, 33a, 34a, 34b, 36 and 36a correspond to 13, 13a, 12a, 12b, 14, 14a, respectively in FIG. 1.

In FIGS. 5 and 6 the lower bar (34) supported link is 38 and the upper connector supporting link is 29.

From the foregoing it will be clear that objectionable chain twisting, especially in short lengths, can be avoided by selective use of the connector 5 of FIG. 1 and the connector 25 of FIGS. 5 and 6.

It is to be understood that the invention is applicable to various shapes and sizes of link-form connectors for use in connection with both long or short pitch chain links of various sizes including the ¾ inch alloy link.

Having thus described my invention, what I claim and desire to secure by Letters Patent of the United States is:

1. A shackle type connector comprising a generally U-form main body member open at one end and providing laterally spaced arms, a socket adjacent the free end of each arm, said sockets substantially aligned with one another and providing opposed inwardly opening recesses, each of said recesses having transversely extending side walls and depth-defining top and bottom walls spaced in the direction of the length of said arms and with the bottom walls adjacent the free ends of the latter, a removable closure bar for the open end of said main body member and having opposite ends seated in the respective arm-provided socket recesses, interengaging seating portions provided by the bottom socket walls and respective opposed end-adjacent edge portions of said bar, the maximum depth of the socketed end portions of the bar between top and bottom edges of the latter being less than the depth dimensions of said socket recesses between the top and bottom walls thereof, two removable pins, each of said pins extending transversely through a different one of said sockets and bearing against the related top recess wall and the opposed top edge portion of the bar, whereby to retain said bar and socket-provided seating portions in said interengagement, the intermediate portion of the bar being concavo-convex as viewed in side elevation to provide a deep transversely extending top surface connector-seating depression and a depending bottom surface hump, said depression being spaced from said sockets and said hump extending in the direction of the length of said arms and commencing adjacent each of said arm sockets, opposite ends of said hump engaging the bottom walls of the respective sockets transversely of the bar length, whereby to prevent inward movement of said arms under bar-transmitted loads lengthwise of said main body member, the respective top recess walls and opposed top end-adjacent edge portions of the bar being substantially equally spaced and each side top recess wall being parallel to the top end-adjacent bar edge portions associated therewith, at least one of said socket recesses extending outwardly all the way through the related arm socket to provide a recess entry and exit opening for said bar, the top wall portion of said last mentioned socket recess and the opposed bar edge portion being inclined outwardly and away from the free end of the related arm end, the minimum dimension of said last-mentioned recess in the direction of the axis of said main body being only slightly greater than the maximum dimension of the relatively inwardly located portion of said bar in the same direction, whereby to admit of the bottom surface of the bar hump clearing the bottom recess wall of said last mentioned socket when the bar is slid outwardly with said inclined wall portions in engagement, the socket recess-engaging portion of the last mentioned bar end being of increased depth as compared to that of the other bar end portion and the top socket recess walls and opposed bar edge portions engaging to constitute guide surfaces when assembling and disassembling of the bar with the U-form body.

2. The structure of claim 1 and each of said interengaging bar and socket provided seating portions comprising a raised seat provided by the bottom wall of said socket recess a seat-engaging recess provided by the bar, and said raised seats commencing adjacent the entries of said socket recesses and terminating short of the outer portions of the latter.

3. The structure of claim 1 and each of said interengaging bar and socket provided seating portions comprising a raised seat provided by the bottom wall of said socket recess and a seat-engaging recess provided by said bar, each seat being transversely curved and located at an inner portion of the related socket recess and also being coextensive in width with the socket recess, the seat-engaging bar recesses being coextensive in width with the bar, the lower surface of the bar-provided hump being curved lengthwise of the bar, and said raised seats terminating short of the outer portions of the respective socket recesses.

4. The structure of claim 1, and said arms being bent adjacent said sockets to dispose the closed body end in substantial crosswise alignment with the connector-seating depression of said bar.

References Cited in the file of this patent

UNITED STATES PATENTS

| | | |
|---|---|---|
| 251,464 | Rogers | Dec. 27, 1881 |
| 465,273 | Iverson | Dec. 15, 1891 |
| 524,182 | Noble | Aug. 7, 1894 |
| 605,656 | Taylor | June 14, 1898 |
| 1,450,389 | Rieff | Apr. 3, 1923 |
| 1,458,622 | Higgins | June 12, 1923 |
| 2,877,621 | Robbins | Mar. 17, 1959 |